United States Patent [19]

Bartley et al.

[11] 4,108,574

[45] Aug. 22, 1978

[54] APPARATUS AND METHOD FOR THE INDIRECT MEASUREMENT AND CONTROL OF THE FLOW RATE OF A LIQUID IN A PIPING SYSTEM

[75] Inventors: Thomas S. Bartley; Quinlan T. Rosenblath, Jr., both of Mobile, Ala.

[73] Assignee: International Paper Company, New York, N.Y.

[21] Appl. No.: 761,214

[22] Filed: Jan. 21, 1977

[51] Int. Cl.$^2$ .................. F04B 49/06; F04B 49/08
[52] U.S. Cl. .................................... 417/19; 417/20; 417/22; 417/54
[58] Field of Search .................................. 417/18–24, 417/12, 54, 45; 73/168

[56] References Cited

U.S. PATENT DOCUMENTS

| 3,068,796 | 12/1962 | Pfluger et al. | 417/19 |
| 3,605,775 | 9/1971 | Zaander et al. | 137/3 |
| 3,779,457 | 12/1973 | Cornyn et al. | 417/63 |
| 3,966,358 | 6/1976 | Heimes | 417/12 |
| 3,994,623 | 11/1976 | Rutshtein et al. | 417/19 |
| 4,024,864 | 5/1977 | Davies et al. | 417/45 |
| 4,026,668 | 5/1977 | Culhane et al. | 417/22 |

*Primary Examiner*—William L. Freeh
*Attorney, Agent, or Firm*—Finnegan, Henderson, Farabow & Garrett

[57] ABSTRACT

Apparatus and process for automatically measuring and controlling the instantaneous flow rate of a liquid in a piping system by varying the speed of a centrifugal pump in response to a flow rate signal determined indirectly by sampling two flow-related parameters associated with the pump and pump motor and then converting in an on-line computer the two measurements to the corresponding unique flow rate value by the use of previously determined mathematical relationships stored in the computer. The mathematical relationships are derived from data correlating flow rate with the two flow-related variables, which data is taken with a flow meter and control valve temporarily installed in the piping system during the "shake-down" testing of the piping system. A third flow-related variable is sampled, a pair of flow rate values determined, and an alarm activated in response to the difference between the values to provide the additional feature of pump mechanical performance monitoring. A viscosity-related property of the fluid also is determined indirectly by the use of a mathematical relationship whenever three flow-related variables are monitored, the mathematical relationships having been derived from data taken by running fluids of different but known values of the viscosity-related property through the piping system during the "shake-down" testing.

31 Claims, 2 Drawing Figures

APPARATUS AND METHOD FOR THE INDIRECT MEASUREMENT AND CONTROL OF THE FLOW RATE OF A LIQUID IN A PIPING SYSTEM

BACKGROUND OF THE INVENTION

1. Field of the Invention

This invention relates to apparatus and processes for the indirect measurement and control of fluid flow rate and the measurement of viscosity-related properties of fluids flowing in systems having a variable speed pumping capability, and for monitoring the mechanical performance of the pump.

The measurement and control of a fluid flow rate can be an important facet of many industrial processes and applications. For example, in the chemical industries wherein one or more fluid materials are introduced into a reaction chamber, accurate control over the flow rates of the separate liquids ensures that proper amounts of the separate reactants will be metered through the reaction chamber to provide optimum product yields and economically efficient operation.

The need for monitoring and control of fluid flow rates is especially important in continuous process applications. In such applications, little or no opportunity exists for testing the reactant mix and subsequently adding a measured amount of one or more reactants to achieve the desired balance. Typical of such non-intermittent applications are certain wood-pulp processing operations which require the continuous flow of a fluid component but at varying flow rates which are determined by other process considerations.

There are two general approaches presently in use for the control of fluid flow rates: (1) opening or closing a control valve in the fluid system while maintaining the pump at constant speed; and (2) increasing or decreasing the speed of the pump while maintaining any control valves in the full-open position. Until the invention of the apparatus and processes to be set forth in more detail hereafter, the pump speed flow control has not been the preferred mode due, in part, to the need for inline flow measurement apparatus to provide a flow signal for control and to the higher initial cost for the variable speed pump drive capability.

There are, however, several distinct benefits and advantages to be gained from using the pump speed flow control mode over the control valve flow control system. First, and most important, the power needed to operate the pump in a pump speed control system can be substantially less than the power expended in a comparable system having control valve control. In either system, the pump will be sized to accomodate the maximum expected flow rate and so the *peak* power requirements of both systems will be the same. However, the pump in the system controlled by a control valve will always be operating at the maximum pump speed while the pump in the pump speed controlled system will operate at maximum speed (and hence capacity) only when maximum flow is actually required.

The power requirements of a centrifugal pump-driven fluid system vary as the product of the pressure rise and the flow rate. Hence, it is to be expected that less power is expended in a pump speed controlled system on a time-average basis than in a comparable fluid system having control valve flow control.

Throughout this specification and also in the claims, the terms "system flow rate," "pump flow rate," and "flow rate" will be used interchangeably. Since the dynamic response of the pump and the piping system will not be considered, the pump and system being always operated in a quasi-steady state condition of flow equilibrium, the instantaneous values of the above-mentioned terms will be equal. Similarly the terms "pump pressure rise" and "pressure rise" will be used interchangeably.

In connection with the use of the latter terms during the course of the subsequent discussion, it must be remembered that the term "pump pressure rise" usually given in units of psi should not be equated to the term "pump head" or "head" in widespread use in the fluid flow art which typically is given in units of feet of the pumped liquid at a particular temperature. The temperature dependence of the "head" variable occurs via the density dependence, and caution must be exercised in converting from measured values of one variable to the other for situations in which significant swings in temperature occur.

In practice, it is extremely difficult, if not impossible, to accurately measure the "head" variable directly, such as by the use of manometers the liquid in which can undergo significant temperature changes. The use of the terms "pressure rise" and "pump pressure rise" throughout the remainder of this specification is intended to reflect the static pressure difference variable that is independent of density.

Another advantage to the pump speed flow control mode involves the pumping efficiency of the particular centrifugal pump employed. Typically, centrifugal pumps are designed to exhibit maximum efficiency at the design flow rate. It is a characteristic of many centrifugal pumps that the decrease in efficiency is less in going from the design flow rate (and pump speed) to a lower flow rate by reducing pump speed than the decrease in pump efficiency caused by an increase in the piping system resistance needed to achieve the same final flow rate. Hence, an additional power savings over and above that described previously can be gained from the use of pump speed flow control.

Other advantages of the use of the pump speed flow control mode include the possible elimination entirely of the control valve, together with the vibration and noise incident to valve throttling, and the attendant maintenance costs. The use of a pump speed flow control mode will also extend the life of pump components, including shaft, sealing glands, bearings and gears, all of which are affected by the high speeds and high discharge pressures that occur at high throttling conditions. The possibly higher capital costs for the use of a more complex pump driver for the pump speed flow control mode can be more than off-set with the above-detailed savings in power expenditure and equipment down-time.

The above-described phenomenon and considerations are well known in the fluid flow art but have been presented herein in order to clarify and accentuate the importance of the invention to be described henceforth.

2. Brief Description of the Prior Art

The U.S. Pat. No. 2,734,458 to Hayes and the U.S. Pat. No. 3,024,730 to Towle, show typical automatic flow control arrangements using pump speed control. The automatic control systems used in these references generally include (1) apparatus to measure water level in a sump or reservoir; (2) apparatus for determining the error between the desired value of the water level and the actual measured value; and, (3) control apparatus that responds to the measured error by adjusting pump speed in the direction which will cause the error to vanish. The Hayes and Towle references, through a system of liquid-filled variable resistors or cam-and-link operated potentiometers, convert the measured liquid level to a corresponding change in the voltage across the secondary windings of the pump motor to control the speed of the motor. Hayes and Towle both recognized the inherent cost savings that accrue by the use of pump speed control in their respective systems.

One inherent shortcoming of flow control systems such as shown in Hayes and Towle, wherein the water level in a sump or reservoir system component is used as the monitor to flow-related variable, is that many industrial processes employ a closed system having no such accumulator elements where a fluid level could be identified and measured. Also, and more importantly, the measurement of a fluid level yields an indication only of the integrated flow rate over a period of time. Such a system can only be used to control at best, a time-average system flow rate. Many industrial processes require an indication and control of the instantaneous flow rate for proper operation.

Direct measurement of the instantaneous flow rate, however, ordinarily requires the introduction of sophisticated measuring apparatus to the fluid system. Such flow measuring devices as venturis or turbine rotor flow meters when installed in the system will add flow resistances that can materially degrade the performance of the overall system. These devices also will increase the initial cost of a fluid system and contribute to the operating cost by requiring frequent periodic maintenance. It is apparent, then, that apparatus and a process for obtaining pump speed flow control which utilize a measurement of the instantaneous flow rate but which does not necessitate the use of the conventional flow measuring devices would be highly desirable.

The use of easily measurable flow-related variables to provide indirect measurement and control of pump pressure rise is known in the art. Such variables typically are associated with the operating characteristics of the pump or pump drive motor. U.S. Pat. No. 3,563,672 to Bergstrom discloses a system for limiting peak pump pressure rise through pump speed control by monitoring the armature current in the pump motor, a variable which also can be easily measured without disturbing the actual fluid system. The use of this associated pressure-related variable, the armature current, by the automatic control system is made possible by the linear interdependence of the current and pressure rise variables for the positive displacement pump used in Bergstrom, as is depicted in FIG. 3 of that reference.

A highly desirable alternative to the use of conventional flow measuring devices to provide an indication of the instantaneous flow rate would be apparatus and a process for measuring two or more flow-related variables associated with the pump and pump drive apparatus such as, but not limited to, pump pressure rise, pump speed, or pumping power and using the measured values to determine the instantaneous value of the system flow rate. Theoretical relationships can be determined which give flow rate as a function of any two of such flow-related variables for systems wherein fluid temperature and viscosity remain relatively constant. Although the functional relations are complex, various mathematical techniques are available for the rapid solution of the equations or other mathematical relationships, including the use of computers. Hence, given the instantaneous values of the two flow-related variables, the equations relating flow rate to these variables could be used to solve for the corresponding value of the instantaneous flow rate.

Although it is known in the art that the instantaneous flow rate of a centrifugal pump-driven fluid system can be determined by measuring any two of certain flow-related parameters such as pump pressure rise, pump speed, and pump power it has been heretofore impossible to utilize these theoretical relationships in an automatic control system because of the inherent non-linearities in the governing equations. For instance, headflow curves for a centrifugal pump typically exhibit a quadratic relationship. This form of variable dependency does not lend itself to conventional control systems, either analog or digital, which require linear dependency.

The present invention solves the aforementioned problems by providing apparatus and process which permit a fluid system flow rate to be automatically and continuously measured and controlled by varying pump speed in response to a flow signal derived from measured values of certain flow-related variables. The apparatus and process of this invention enable all the benefits and advantages of a pump speed flow control mode hereinbefore described to be achieved while eliminating or substantially reducing the disadvantages of directly monitoring instantaneous flow rate by the use of conventional flow rate measuring apparatus and processes.

Additionally, the apparatus and processes of the present invention allow monitoring of the mechanical performance of the pump without the need to measure flow directly, to provide an indication of unacceptable degradations in pumping capability such as caused by a worn or broken impeller.

Also, the apparatus and processes of the invention to be disclosed hereinafter enable certain properties related to the viscosity of the pumped fluid to be determined automatically and continuously without the need to employ conventional measuring devices and techniques.

Such properties include the kinematic viscosity of ordinary liquids and the "consistency" of the liquid-fiber slurries commonly found in wood pulp processing applications, as that term is used in the publication entitled Cameron Hydraulic Data, G. V. Shaw and A. W. Loomis, Ingersoll-Rand Co., 11th ed., c 1942. The "consistency" of a fiber-water slurry is roughly defined as the weight percent of fiber in the slurry but can also be affected by the fiber type, degree of air entrainment, and other parameters.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims.

SUMMARY OF THE INVENTION

To achieve the foregoing advantages and benefits and in accordance with the purpose of the invention, as embodied and broadly described herein, the apparatus of this invention for automatically and continuously measuring and controlling the rate of flow of a liquid in a piping system comprises a centrifugal pump; a variable speed drive means for driving the pump; means for sensing at least two variables related to flow, the flow-related variables being associated with the pump and the drive means, the sensing means including means for generating and transmitting signals representative of the instantaneous value of each variable sensed; calculating means including a memory unit containing stored therein a set of mathematical relationships relating flow to the two flow-related variables, a converter unit for receiving the transmitted signals and transforming the signals into a converted signal representative of flow rate by use of the stored mathematical relationships, and detection unit for comparing a reference signal representing a desired flow rate with the converted signal and for determining the error therebetween; and control means responsive to the error for varying the speed of the variable speed drive means. As herein embodied, the sensing means includes means for sensing at least two of the pump pressure rise, pump speed, and pump drive power flow-related variables.

As herein embodied, the variable speed drive means is electric and the sensing means includes means for sensing power used by the electric drive means. Preferably, the electric drive means includes a AC motor and a variable frequency AC motor power supply. It is also preferred that the calculating means is digital and that the signals generated, transmitted and converted are pulse trains having frequencies proportional to the value of the respective represented variable.

Further in accordance with this invention, apparatus for monitoring the mechanical performance of a centrifugal pump in a piping system that includes the pump coupled with a variable speed pump drive means as the prime mover for the liquid flowing therein comprises means for sensing three flow-related variables including pump pressure rise and at least two other flow-related variables associated with the pump and the drive means, the sensing means also including means for generating and transmitting signals representative of the instantaneous value of each of the sensed variables; calculating means including memory means containing stored therein two sets of mathematical relationships each relating flow rate to two of the three flow-related variables wherein the pump pressure rise variable is used in only one of the two relationship sets, converter means for receiving the transmitted signals and transforming the signals into a first converted signal and a second converted signal both representative of flow rate by use of the stored mathematical relationships, and means for comparing the first and second converted signals for determining the difference therebetween; and means responsive to the difference for actuating an alarm.

As herein embodied, the two other flow-related variables associated with the pump and the drive means are pump speed and pump drive power and the calculating means is digital, the signals generated, transmitted and converted being pulse trains.

Still further in accordance with the invention, apparatus for continuously measuring a viscosity-related property of a liquid flowing at variable rates in a piping system that includes a centrifugal pump coupled with a variable speed pump drive means as the prime mover for the liquid comprises means for sensing at least three flow-related variables, the flow-related variables being associated with the pump and the drive means, the sensing means also including means for generating and transmitting signals representative of the instantaneous value of each of the sensed variables; calculating means including memory means containing stored therein a set of mathematical relationships relating the viscosity-related property to the three flow-related variables, converter means for receiving the transmitted signals and transforming the signals into a converted signal representative of the viscosity-related property by use of the stored mathematical relationships; and means for displaying the converted signal.

As herein embodied, the three flow-related variables associated with the pump and pump drive means are pump pressure rise, pump speed, and pump drive power. As also embodied herein, the calculating means is digital and the signals generated, transmitted and converted are pulse trains.

In accordance with the invention, as embodied and broadly described herein, the process for measuring and controlling the rate of flow of a liquid in a piping system having a centrifugal pump which functions as the final control element, a variable speed drive means for driving the pump, and means for sensing at least two flow-related variables associated with the pump and the pump drive means, which process comprises the steps of obtaining data correlating flow rate with the two flow-related variables; developing a set of mathematical relationships relating flow rate to the two flow-related variables and storing the set of mathematical relationships in a calculating means; operating the system in a normal mode; sensing the two flow-related variables and generating and transmitting to the calculating means signals representative of the flow-related variables with the system operating in the normal mode; converting in the calculating means the signal representing the flow-related variables to a signal representative of flow rate through use of the stored set of mathematical relationships; comparing the signal representative of the flow rate with a reference signal representative of a desired flow rate and determining the difference between the flow rate signal and the desired flow rate signal; and varying the speed of the variable speed pump drive means in response to the difference.

As herein embodied, the step of obtaining data correlating flow rate with the two flow-related variables includes temporarily installing a flow meter and control valve downstream of the pump, operating the pump over an expected range of flow rate values and system flow resistances by varying the speed of the pump and the opening of the control valve, and recording simultaneous values of the flow rate and the two flow-related variables.

Preferably, the two flow-related variables are any two of pump pressure rise, pump speed, and pump drive power variables.

Further in accordance with the invention, the process for continuously monitoring the mechanical performance of a centrifugal pump installed in a piping system, the pump being coupled with a variable speed drive means and being the prime mover for liquid flowing therein, the piping system also having means for sensing three flow-related variables including pump pressure rise and two other flow-related variables associated with the pump and the pump drive means, comprises the steps of obtaining two sets of data each set correlating the flow rate of the liquid through the centrifugal pump with two of the three flow-related variables wherein the pump pressure rise variable appears in only one of the two data sets; developing two sets of mathematical relationships each relating flow rate to two flow-related variables using the data sets and storing the sets of mathematical relationships in a calculating means; operating the system in a normal mode; sensing the pump pressure rise and the two other flow-related variables and generating and transmitting to the calculating means signals representative of the three flow-related variables with the piping system operating in the normal mode; converting in the calculating means the signals representing the three flow-related variables to first and second converted signals each representative of flow rate through use of the stored sets of mathematical relationships; comparing in the calculating means the first converted signal with the second converted signal and determining a difference therebetween; and actuating an alarm in response to the difference.

As herein embodied, the step of obtaining two sets of data each set correlating the flow rate of the liquid through the centrifugal pump with two of the three flow-related variables wherein the pump pressure rise variable appears in only one of the two data sets includes temporarily installing a flow meter and throttling valve downstream of the pump, operating the pump over an expected range of flow rate values and system flow resistances by varying the speed of the pump and the opening of the control valve, and recording, for each data set, simultaneous values of the flow rate and the corresponding two of the three flow-related variables.

Still further in accordance with the invention, the process for measuring a viscosity-related property of a liquid flowing in a piping system, the system having a centrifugal pump which functions as the final control element, a variable speed drive means for driving the pump, and means for sensing three flow-related variables associated with the pump and the pump drive means comprises the steps of obtaining a set of data correlating the viscosity-related property with the three flow-related variables; developing a set of mathematical relationships relating the viscosity-related property to the three flow-related variables using the data and storing the set of mathematical relationships in a calculating means; operating the system in a normal mode; sensing the three flow-related variables and generating and transmitting to the calculating means signals representative of the three flow-related variables with the piping system operating in the normal mode; converting in the calculating means the signals representing the three flow-related variables to a signal representative of the viscosity-related property through use of the stored set of mathematical relationships; and displaying the converted signal.

As herein embodied, the step of obtaining data correlating the viscosity-related property with the three flow-related variables includes temporarily installing a flow meter and throttling valve downstream of the pump, operating the pump in the viscosity-related property, and recording simultaneous values of the viscosity-related property and of the three variables.

The accompanying drawings, which are incorporated in, and constitute a part of, the specification, illustrate one embodiment of the invention and, together with the description, serve to explain the principles of the invention.

DESCRIPTION OF THE PREFERRED EMBODIMENT

Reference will now be made in detail to the present preferred embodiment of the invention, an example of which is illustrated in the accompanying drawing.

Figure 1:
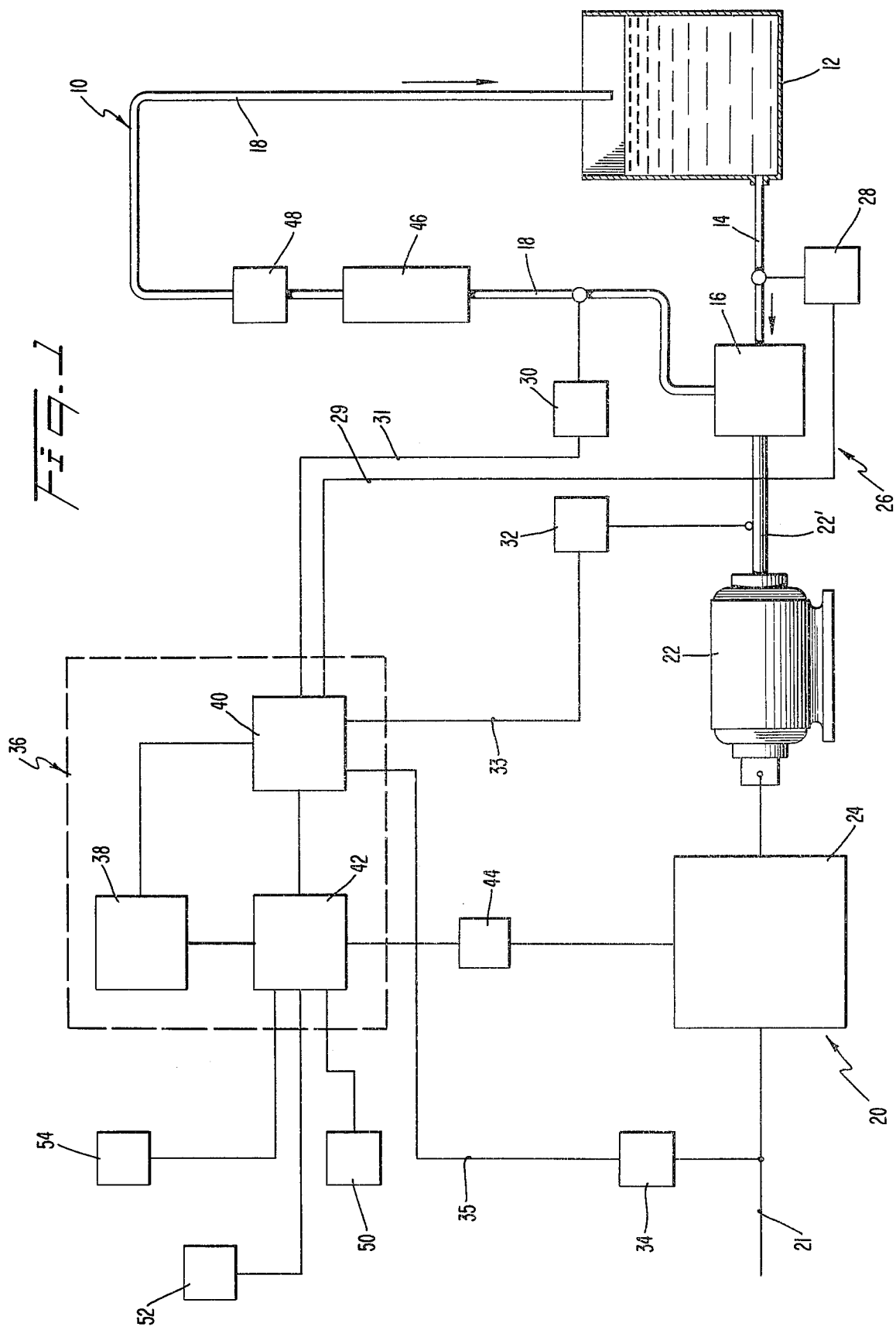
FIG. 1 is a diagram of a piping system wherein the liquid flow rate is measured and controlled by apparatus and processes constructed and performed in accordance with the teachings of this invention and is one embodiment thereof.
Figure 2:
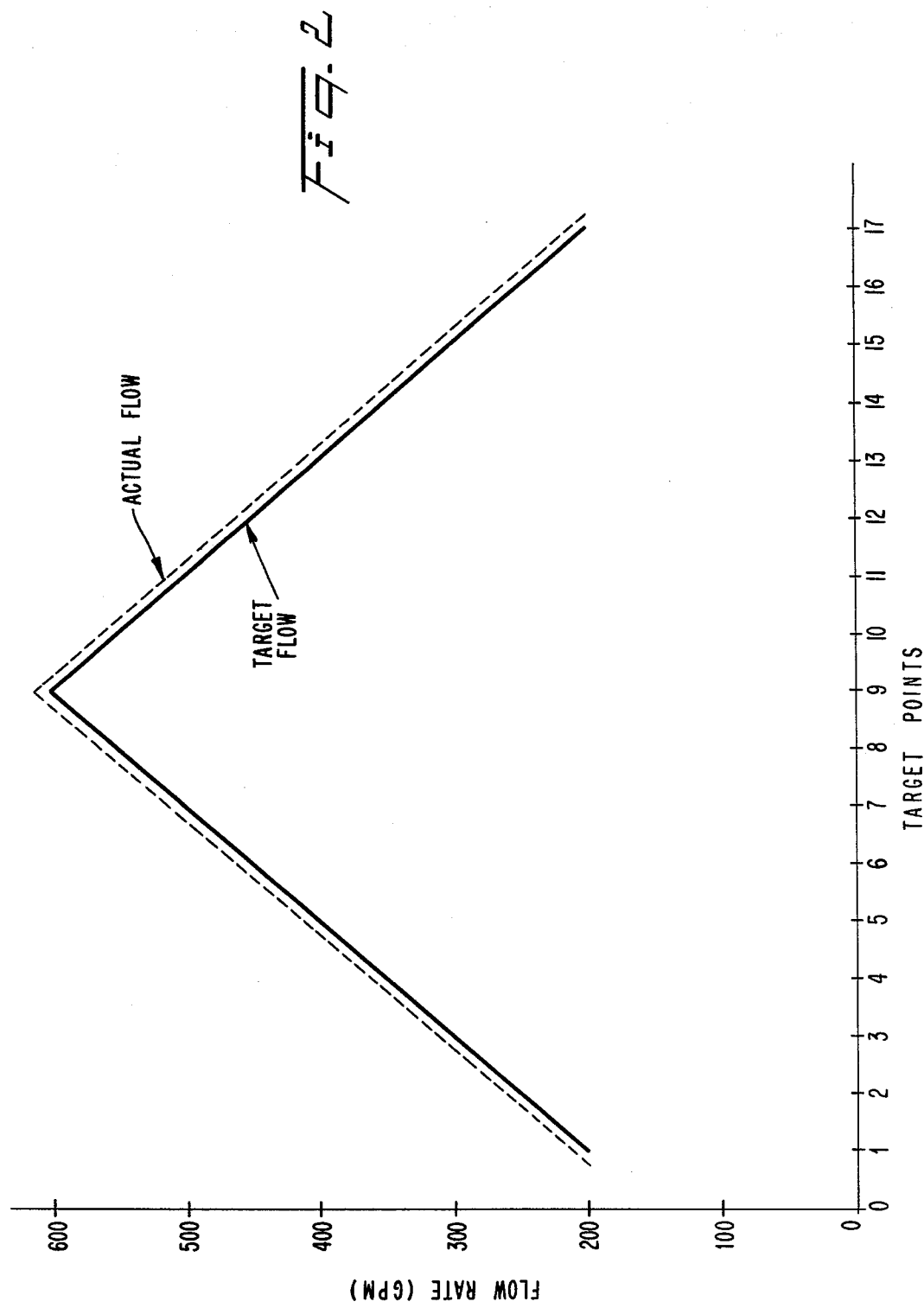
FIG. 2 presents a graph showing actual flow versus target flow obtained using the embodiment of the present invention shown in FIG. 1.

Referring now to FIG. 1, it may be seen that piping system 10, for which desired flow control is achieved by the use of the present invention, includes tank 12, which serves as a reservoir for the liquid to be pumped and also as the depository for the liquid exiting the system, inlet piping 14 which is fluidly connected to the bottom of tank 12 for receiving the system fluid from the reservoir, and exit piping 18 which carries the system fluid back to tank 12 and which exit piping constitutes or simulates the system "load". The fluid system 10 depicted in FIG. 1 is a test loop designed to prove the operation of the instant invention; it is not intended as a limitation on the applications of the instant invention, and, therefore, should not be construed to restrict in any way the scope of the present invention.

In accordance with the invention, there is provided centrifugal pump 16 as both the measuring element and as the final control element for the liquid in system 10. In the illustrated test loop, a Gould model 3175 pump rated at 650 gpm and 160 feet head at 1780 rpm was used. The inlet to pump 16 is connected to tank 12 by inlet pipe 14, which piping consisted of 2 feet of 6 inch pipe. Tank 12 has a capacity of 800 gallons. The elevation of the water level in tank 12 was kept at approximately 4.5 feet above the inlet to centrifugal pump 16, a level which was sufficient to prevent cavitation of the pump during operation.

In accordance with the invention, there is also provided means 20 to drive the centrifugal pump 16. As herein embodied, drive means 20 is electric and preferably includes AC motor 22 and excitation supply 24 for providing a smooth variation in the speed of motor 22. In the test loop, a Reliance Inverter Drive number 0/200 was used with a 50 horsepower 1770 rpm AC motor Reliance model Frame 326T to drive centrifugal pump 16. The Reliance Inverter Drive was found to provide acceptable continuously variable excitation for the AC motor over the frequency range corresponding to the required pump speeds. Motor 22 drives pump 16 by means of pump shaft 22'.

In accordance with the invention, means 26 is provided for sensing two variables related to flow that are associated with pump 16 and pump drive means 20. Sensing means 26 also includes means for generating and transmitting signals representative of each variable sensed. As herein embodied, sensing means 26 includes means for sensing the pressure rise across pump 16. In the test loop, pressure transducers 28 and 30 were used to sample pressure immediately upstream and immediately downstream of centrifugal pump 16. The signals from transducers 28 and 30, as shown in FIG. 1, were transmitted directly by cables 29 and 31 to calculating means 36, to be described hereafter, wherein the signals were differenced to provide a signal representative of the pump pressure rise a flow-related variable. Also, within the scope of the invention, the signals from transducers 28 and 30 could have been pre-processed to yield a single signal representative of the pump pressure rise before transmission to calculating means 36.

Pressure transducers 28 and 30 are operatively mounted in pressure taps on inlet pipe 14 and outlet pipe 18, respectively. Pipes 14 and 18 are of the same diameter, and the elevations of pressure taps 28 and 30 are the same in order to eliminate the pressure components due to differences in the inertial forces and elevations. This instrumentation technique is well known to those familiar with the fluid flow art. The magnitude of these inertial and elevational pressure components in systems with varying pipe diameters and elevations can be readily computed using the Bernoulli equation. The pressure transducers that were used in the test loop were Foxboro model E11GM and were found to perform satisfactorily.

Theoretically, as expressed by the well-known "pump affinity laws," the flow rate through a centrifugal pump is correlated by the pump head variable and not by the pump pressure rise parameter. As mentioned previously, these variables are related through the density of the pumped liquid. However, for water or a water-based liquid in many applications, including the piping system shown in FIG. 1, the error introduced in using the pump pressure rise variable is small, and an adequate degree of flow rate measurement and control can be achieved using this variable through the use of the apparatus and process disclosed herein.

As herein embodied, sensing means 26 can also include means 32 for sensing pump speed, another flow-related variable. A tachometer, such as Airpax Electronics model 0800 which was used in the test loop, can be utilized satisfactorily to measure the rotational speed of the pump shaft. In the test loop, a signal corresponding to pump speed was generated by the tachometer and was transmitted to calculating means 36 by cable 33. Pump speed sensing means 32 is shown operatively connected to pump shaft 22' in FIG. 1.

As herein embodied, sensing means 26 can also include means 34 for measuring the power input to the variable speed drive means 20, to sense yet another flow-related variable. Power sensing means 34 included a Rochester Instruments System wattmeter model No. 0409, and is shown connected to power supply line 21 for measuring the total power input to the pump drive means ($P_i$). The signal from power sensing means 34 was transmitted to calculating means 36 by cable 35.

In general, the actual $P_o$ power delivered to the pump motor 22 is somewhat less than the value ($P_i$) measured by power sensing means 34 because of the electrical losses in the excitation supply 24. Additional electrical losses in the pump drive motor 22 result in a further decrease in the power delivered to the pump $P_s$, for the same initial $P_i$. Theoretically, it is the value $P_s$ that should be used with another flow-related variable to correlate the flow rate, but it has been found that the $P_o$ and $P_i$ parameters also can be used as an indication of pump drive power. The ability to use the $P_o$ or $P_i$ parameter as well as $P_s$ stems from the fact that the electrical losses referred to above either are small compared to the absolute magnitudes of $P_i$, $P_o$, or $P_s$ or are known or ascertainable monotonic functions of the pump speed. As a result, the $P_o$ or $P_i$ parameters can be measured and used "as is" or adjusted to more accurately reflect the pump drive power $P_s$ by the use of these functional relations.

Preferably, the fluid system pressure rise signal from pressure sensing means 28 and 30 and the signal from pump speed sensing means 32 are the required pair of signals to be used by the calculating means 36 to determine the instantaneous system flow rate in accordance with the procedures to be disclosed henceforth. It may also be preferred that the system pressure rise signal derived from the signals from pressure sensing means 28 and 30 be used with the signal from pump drive power sensing means 34 to provide the necessary pair of signals corresponding to the values of two flow-related variables.

In accordance with the invention, calculating means 36 is provided which includes a memory unit 38, converter unit 40 and detection unit 42. Stored within memory unit 38 are mathematical relationships relating the system flow rate and the two flow-related variables monitored by sensing means 26. Converter unit 40 receives the signals corresponding to the two flow-related variables transmitted from sensing means 26 and transforms the signals into a converted signal that is representative of the system flow rate. Converter unit 40 is operatively connected to memory unit 38 whereby the appropriate stored mathematical relation in memory unit 38 can be used to generate the converted signal. Detection unit 42 is operatively connected to converter unit 40 and receives the converted signal that is representative of the system flow rate. Detection unit 42 compares the actual flow rate, as represented by the converted signal, with a desired flow rate, represented by a reference signal supplied from flow rate setting means 50, to determine the error between the desired flow rate and the actual flow rate.

The mathematical relationships stored in memory unit 38 can be in the form of a set of equations which would directly relate flow rate (the dependent variable) to the two flow-related variables (the independent variables) such as the following:

$$Q = ax_1^n + bx_2^m$$

where:
Q is the flow rate
a, b are empirically determined coefficients
$x_{1,2}$ are the flow-related variables; and
n, m are empirically determined exponents.

Or, and also being within the scope of the present invention, if the flow-related variables are selected from pump pressure rise, pump speed and pump drive power, a series of equations corresponding to discrete segments of the pump operating range can be stored and the following well-known pump affinity laws used to interpolate between the equations:

$$\frac{Q_1}{Q_2} = \frac{S_1}{S_2}$$

$$\frac{\Delta P_1}{\Delta P_2} \cong \left(\frac{S_1}{S_2}\right)^2$$

$$\frac{P_1}{P_2} = \left(\frac{S_1}{S_2}\right)^3$$

where:
$\Delta P$ is pump pressure rise
S is pump speed
P is pump drive power
Q is flow rate And finally, an array of data sets correlating the flow and flow-related variables can be stored directly, and used with standard interpolative techniques to obtain values between the discrete data points whereby a value of the flow rate can be calculated given inputed values of the two flow-related variables.

The apparatus and techniques for achieving the functions of memory unit 38, converter unit 40, and detection unit 42 are well known in the control system art. For the test loop pictured in FIG. 1, a General Automation SPC-12 general purpose digital computer was used to provide the functions of calculating means 36. A standard teletype was used to communicate with the General Automation computer and to provide the function of apparatus 50 for supplying a reference or bias signal indicative of a desired or target flow rate.

In accordance with the invention, means 44 is provided to control the speed of the variable speed drive means 20. Control means 44 is responsive to the error signal generated by detection unit 42 of calculating means 36. Apparatus and techniques for achieving the function of control means 44 are also well known in the art, and in the test loop a Leeds & Northrup model No. 446-3 controller was found to perform satisfactorily.

The flow control apparatus of FIG. 1 also can be used to measure a viscosity-related property of the liquid flowing in piping system 10. The mathematical relationships governing the flow rate of a liquid such as water through a piping system having a centrifugal pump include a rather complex functional dependency on the liquid kinematic viscosity, one such viscosity-related fluid property (see Marks, *Mechanical Engineer's Handbook*, 5th ed., 1951, pp. 1850–1852). Such a dependency, up to this point, has been accounted for by implicitly assuming a liquid with a constant kinematic viscosity. For liquids such as water and for constant temperature operation, this assumption is warranted. However, many industrial applications involve piping systems with liquids having a significantly varying kinematic viscosity, such as applications wherein the liquid can experience large (50°–100° F) temperature variations at a given station or wherein varying amounts of solid or semi-solid materials are carried in the liquid. The wood pulp processing industry is an example of the latter type of application. Close control of the flow rate in such an application requires an indication of the instantaneous value of the kinematic viscosity of the fluid or of another viscosity-related fluid parameter such as the "consistency."

As embodied herein, for measuring a viscosity-related property of the liquid flowing in piping system 10, the flow control apparatus of FIG. 1 has sensing means 26 including means for simultaneously sampling a third flow-related variable associated with the pump 16 and pump drive means 20. Also, calculating means 36 has the capacity to process the additional signal; that is, memory unit 38 has stored therein another set of mathematical relationships relating the viscosity-related property to the three flow-related variables, and converter unit 40 includes computation means to convert the three signals into a converted signal representing the viscosity-related property. The property signal is then displayed via display means 52. Display means can be any conventional read-out device such as a dial indicator or digital meter.

The flow control apparatus of FIG. 1 also can be used to monitor the mechanical performance of a centrifugal pump, such as pump 16 in piping system 10. A serious degradation in pump performance is often associated by wear ring wear and with damage to the pump impeller such as by uneven wear, by stress-failure of a blade, or by severe blade erosion caused by cavitation. It can be expected that decrease in pump efficiency will be reflected in changes in the correspondence between the flow-related variables and the actual system flow rate. For instance it is to be expected that an increase in both the pump speed and the pump drive power would be required to achieve a specified flow rate with a damaged or worn impeller, as compared to operation with a new impeller. However, as the pump pressure rise required to achieve a given system flow rate for a given system resistance remains unchanged with impeller condition, the error in a flow rate calculation utilizing this parameter could be expected to be less than that in a calculation using two variables other than pump pressure rise. Therefore, a flow rate calculated using pump pressure rise and another flow-related variable would tend to differ from a flow rate calculated using two variables other than pump pressure rise, both calculated flow rates, of course, being in error from the true system flow rate. This difference would tend to increase with the degree of degradation in the impeller performance.

As herein embodied, for monitoring the mechanical performance of centrifugal pump 16, sensing means 26 includes means for simultaneously sensing a third flow-related variable associated with pump 16 and pump drive means 20, pump pressure rise being one of the two original flow-related variables sampled. In the system pictured in FIG. 1, the other two flow-related variables that could be sensed are pump speed and pump drive power. The sensing apparatus and technique for generating and transmitting representative signals for these three flow-related variables were discussed previously.

Calculating means 36 is also adapted to receive the third signal and to generate a second converted signal representative of flow rate using the third variable and the other of the original two variables. It is intended by this restriction that the pump pressure rise variable is used as the precursor for only one of the two signals representing flow, this being the first converted signal. As an alternative scheme for accomplishing this same objective, the reasons for which hereinbefore have been made clear, the pump pressure rise can be the third variable and wherein the first flow signal is generated from the two original flow-related variables which original variables did not include pump pressure rise. It is obvious that the above-described alternatives are really mirror images and are basically the same invention.

Memory unit 38 has stored therein a second set of mathematical relationships relating flow rate to the third variable and the other of the two original variables, converting unit 40 being adapted to receive and process the three signals. Detection unit 42 also includes means for differencing the two flow rate signals. There is provided alarm means 54 operatively connected to detection unit 42 for responding to the aforesaid calculated difference. Alarm means 54 can be audio or visual, or both, and can include means for automatically terminating power to the pump drive means 20. Such alarm devices and associated shutdown devices are well known in the instrumentation and systems control art.

In operation, and also in accordance with the invention for measuring and controlling the rate of flow of a liquid in a piping system having a centrifugal pump as the prime mover and final control element, data is first obtained correlating values of flow rate and values of the two flow-related variables at various pump speeds corresponding to the expected operating range of the fluid system 10. As herein embodied, for piping system 10, this was accomplished by installing flow meter 46 and throttling valve 48 in the test loop in exit piping 18 downstream of centrifugal pump 16. By varying the setting of the throttling valve, varying system flow resistances were simulated which allowed the pump to be operated over a range of flow and pressure drop conditions for a given speed and the required data to be taken. A Fisher Controls Co. model 657 throttling valve was used successfully in the test loop. A Foxboro Co. model 2804 flow meter was used in the test loop which enabled measurements to be taken of the instantaneous flow rate with an accuracy of ±3.75 gpm over the range of pump conditions measured.

The use of a temporarily installed flow meter such as meter 46 and a throttling valve such as valve 48 installed temporarily, that is, during the "shake-down" testing of the actual piping system application, is but one way to obtain the required correlation data and the disclosure of this manner of obtaining the data is not intended to limit in any way the scope of the invention.

For instance, pump performance curves showing pump head vs. flow rate for various pump speeds are often generated by a centrifugal pump manufacturer for use by purchasers of his products in the design of their piping system. If pump head and pump speed are the flow-related parameters to be monitored in the particular application, then these performance curves can be used directly to obtain the required data. A word of caution is necessary at this point, however. Such pump performance curves are typically the manufacturer's minimum performance specifications of a particular model type for purposes of warranty and may not reflect either the best estimate performance of the average pump or the performance of the pump actually purchased. The particular application and required tolerance on flow rate measurement and control will dictate whether such "average" data is adequate or whether the data must be obtained from the actual pump operating in the particular piping system such as by temporarily installing a flow meter and throttling valve.

In accordance with the invention, and being the next step in the process for controlling the rate of flow, the data correlating the pump flow with the various flow-related variables that was obtained in the previous step is used to develop a set of mathematical relationships having flow rate as the dependent variable and the flow-related variables as the two required independent variables. Techniques for deriving the mathematical relationships from the correlated data sets are well known in the art. The technique employed in the data reduction for the tests run on the embodiment of FIG. 1 included the selection of a generalized equation with unknown constants for the coefficients and exponents of the independent variables and then, through a regression technique, using the empirical data to determine the coefficient and exponent values that minimized the sum of the squares of the deviations of the calculated values of flow rate from the actual test values. This "least squares" fit can be done by hand or by the use of a digital computer using standard automated calculational techniques.

The developed mathematical relationships are then stored in memory unit 38 of digital calculating means 36, for reference and utilization by converter unit 40 and detection unit 42. For the test loop pictured in FIG. 1, a digital computer was used as part of calculating means 36.

The relationships for flow rate in piping system 10 as a function of pressure rise variable and the pump speed variable, and also the relationships relating flow rate to pump power and pump speed, that were developed from the empirically generated data were used for the test runs conducted on the apparatus of FIG. 1. However, the mathematical relationships relating flow rate and the pump drive power and pump speed variables could be similarly employed for flow control purposes in the test loop using the above-described apparatus and techniques.

In accordance with the invention, and following the step of developing a set of mathematical relationships relating the empirical data, the piping system would be operated in a normal mode. As herein embodied, in applications where a flow meter and throttling valve are temporarily installed in the piping system for the data collection step, the flow meter and throttling valve would ordinarily be removed from the fluid system at this point. However, in the case of the test loop pictured in FIG. 1, flow meter 46 and control valve 48 were retained in fluid system 10 in order to provide an indication of the true value of the instantaneous flow rate to measure control system performance and also to change the system resistance in order to vary the scope of the experiments. After the removal of the flow meter and throttling valve from an operational system, it is intended that flow would be measured and controlled solely using the apparatus, and by the process, disclosed in the present invention.

In obtaining the required data correlating flow rate with two flow-related variables, care must be taken not to operate the pump in the unstable region near its shut-off head. The mathematical relationship derived from the data obtained in this region can lead to significant errors when subsequently used for measurement and control. It is well known in the fluid systems art that operation in such regions of instability can lead to oscillations or "surging" in the flow rate and therefore, continued operation in this region is usually avoided.

The remaining sequence of steps to be employed in the process for measuring and controlling the rate of flow in a piping system having a centrifugal pump as the final control element are abundantly evident from the foregoing description of the flow control apparatus. These remaining steps include sensing the two flow-related variables; converting signals representative of their instantaneous value to a signal representative of flow rate; comparing the converted signal with a reference signal representative of a desired rate of flow and determining the difference therebetween; and finally, varying the rotational speed of the centrifugal pump in response to the difference.

In actual practice, this sequence of steps may be repeated on a continuous basis during the duration of the operation of the centrifugal pump in the piping system. In the test loop shown in FIG. 1, this sequence repetition was provided by the use of an on-line computer in calculating means 36 and by continuously monitoring the two flow-related variables chosen for the tests. In all phases of the tests, the control means 44 also was continuously activated thereby enabling the pump speed to be varied whenever a non-zero error between actual and target flow was calculated by calculating means 36.

Table I presents a sample of the data taken during experiments conducted with the test loop pictured in FIG. 1.

TABLE I

| TARGET POINT NUMBER | DATA GROUP NUMBER | PUMP SPEED (RPM) | FLOW ACTUAL (GPM) | SUCTION PRESSURE (PSI) | DISCHARGE PRESSURE (PSI) | FLOW TARGET (GPM) | PUMP POWER (KW) | TEMPERATURE (F) |
|---|---|---|---|---|---|---|---|---|
| 1 | 15 | 608.63 | 202.00 | 1.71 | 8.38 | 200.00 | 2.99 | 75.38 |
| 2 | 45 | 763.88 | 261.50 | 1.70 | 12.50 | 250.00 | 3.85 | 75.88 |
| 3 | 105 | 925.88 | 314.00 | 1.59 | 17.6 | 350.00 | 4.72 | 75.88 |
| 4 | 135 | 1038.38 | 358.00 | 1.54 | 22.06 | 350.00 | 5.96 | 76.25 |
| 5 | 165 | 1173.38 | 399.00 | 1.49 | 27.50 | 400.00 | 7.36 | 77.13 |
| 6 | 195 | 1290.38 | 452.00 | 1.40 | 33.00 | 450.00 | 8.57 | 78.25 |
| 7 | 225 | 1433.25 | 498.50 | 1.34 | 38.56 | 500.00 | 10.98 | 78.88 |
| 8 | 255 | 1559.25 | 557.00 | 1.08 | 44.75 | 550.00 | 13.41 | 80.13 |
| 9 | 315 | 1686.38 | 609.00 | 1.01 | 52.88 | 600.00 | 15.68 | 84.25 |
| 10 | 345 | 1555.88 | 564.00 | 1.02 | 44.81 | 550.00 | 13.59 | 85.50 |
| 11 | 375 | 1454.63 | 517.00 | 1.21 | 38.31 | 500.00 | 11.56 | 87.00 |
| 12 | 405 | 1301.63 | 464.00 | 1.38 | 32.75 | 450.00 | 8.73 | 88.38 |
| 13 | 465 | 1179.00 | 414.00 | 1.47 | 27.25 | 400.00 | 7.42 | 89.75 |
| 14 | 495 | 1042.88 | 359.00 | 1.53 | 21.94 | 350.00 | 5.98 | 89.88 |
| 15 | 525 | 904.50 | 310.50 | 1.56 | 16.56 | 300.00 | 4.66 | 90.38 |
| 16 | 555 | 763.88 | 260.00 | 1.62 | 12.50 | 250.00 | 3.87 | 90.63 |
| 17 | 585 | 616.50 | 206.50 | 1.67 | 8.63 | 200.00 | 2.81 | 90.63 |

FIG. 4 presents graphically the results of the tests, and demonstrates that adequate measurement and control of the flow rate was achieved by the use of the apparatus and process disclosed herein. The input power flow-related variable also was monitored to provide data that could be used to determine potential power savings over a comparable system suing conventional control valve flow control. Using an anticipated operating schedule for a fluid system similar to that shown in fIG. 1, test results indicated that the variable pump speed flow control apparatus and process disclosed herein would offer an annual savings of approximately $470 in energy costs based on $0.015 per kw-hr and 355 operating days per year.

As embodied herein, it is intended that basically the same sequence of steps be used to carry out a pump performance monitoring function using this invention, but with the following additions and modifications. Data correlating system flow rate with a third flow-related variable is taken concurrently with the other empirical data with the caveat that pressure rise must be one of the three flow-related variables monitored. Two sets of mathematical relationships are derived relating flow to a different two of the three flow-related variables but pump pressure rise is used as an independent variable for only one set. For instance, the variables monitored in the test loop of FIG. 1 could yield a {pump pressure rise/pump speed and pump speed/pump drive power} grouping or {a pump pressure rise/pump drive power and pump speed/pump drive power} grouping.

During operation, in a fashion similar to the flow rate measurement and control process just described, the three variables are monitored, but two flow signals are generated from the signals representing the three variables using the appropriate mathematical relationship sets. These signals are differenced and, when the difference exceeds a predetermined value, an alarm is actuated, indicating an unacceptable level of pump impeller performance.

The difference in the two calculated flow rates will be negligible for operation during the period immediately after the piping system is returned to the normal operating mode, that is, after the removal of the control valve and flow meter. This equivalence is to be expected in that both sets of mathematical relationships governing the calculation of the flow rate were derived using data taken at the same level of pump mechanical performance.

After continued operation, following significant wear ring wear, impeller wear or catastrophic failure of an impeller blade, the difference between the two calculated flow rates can be expected to be significant, inasmuch as the decreased pumping efficiency will result in a greater error in one of the calculated flow rates than in the other for reasons described previously.

As herein embodied, the flow control process described previously can also be adapted to measure a viscosity-related property of the liquid flowing in a piping system having a centrifugal pump as the final control element. In this case, as in the configuration used to monitor pump impeller performance, three flow-related variables are monitored. However, during the data-taking stage, liquids of different but known viscosities are used in the piping system, and an appropriate set of mathematical relationships is generated correlating the viscosity-related property with the three flow-related variables. Examples of liquids that could be used in piping system 10 to generate correlating data for the eventual determination of the kinematic viscosity property, together with values of their kinematic viscosity in units of centistokes, include black liquor, 0.5–500 centistokes and paper coating at common shear rates, 350–3500. If the "consistency" of the fluid is the sought-after fluid property, then wood pulp slurries with known consistency percentages ranging from 0.5% to 4+% can be used to generate the necessary data.

During normal operation of the piping system, that is, without the instrumentation used to obtain the empirical data, all three variables are monitored and the signals from the respective sensing instruments are converted to a signal representing the viscosity-related property by the use of the mathematical relationships. For the test loop shown in FIG. 1, pump pressure rise, pump speed, and pump drive power are three flow-related variables that could be monitored to achieve measurement of a viscosity-related property by the process disclosed herein.

It will be apparent to those skilled in the art that various modifications and variations could be made in the apparatus and process of the invention without departing from the scope or spirit of the invention.

What is claimed is:

1. Apparatus for continuously controlling the rate of flow of a liquid in a piping system in agreement with a desired flow rate, the apparatus comprising:

(a) a centrifugal pump;

(b) means for driving said pump, said driving means having a continuously variable speed capability;

(c) means for indirectly and continuously measuring the instantaneous rate of flow of the liquid in the piping system, said indirect measuring means including (A) means for sensing at least two flow-related variables, said flow-related variables being associated with said pump and said driving means, said sensing means also including means for generating and transmitting signals representative of the instantaneous value of each of the sensed variables;

(B) calculating means including (i) memory means containing stored therein a set of mathematical relationships relating flow rate to said two flow-related variables, (ii) converter means for receiving the transmitted signals and transforming the signals into a first converted signal representative of flow rate by use of the stored mathematical relationships, and (iii) means for comparing a reference signal representing the desired flow rate with said first converted signal and for determining the error therebetween; and (d) control means responsive to said error varying smoothly the speed of said variable speed drive means.

2. The flow rate control apparatus of claim 1 in which said sensing means includes means for sensing the power used by said variable speed drive means.

3. The flow rate control apparatus of claim 1 in which said calculating means is digital and wherein all of said signals generated and transmitted by said sensing means and received by said calculating means are pulse trains having frequencies proportional to the instantaneous values of the respective represented variables.

4. The flow control apparatus of claim 1 wherein said variable speed drive means is electric.

5. The flow control apparatus of claim 4 wherein said variable speed drive means includes a frequency controlled AC electric motor and an AC electric motor power supply capable of providing excitation continuously over a range of electric frequencies.

6. The flow rate control apparatus of claim 1 in which said sensing means includes means for measuring the pressure rise developed by said pump.

7. The flow rate control apparatus of claim 6 in which said pressure rise sensing means includes a pressure-sensing means located upstream of said pump and a pressure-sensing means located downstream of said pump.

8. The flow rate control apparatus of claim 6 in which said sensing means also includes means for measuring the speed of said pump.

9. The flow rate control apparatus of claim 6 in which said sensing means also includes means for sensing the power used by said variable speed drive means.

10. The flow rate control apparatus of claim 1 in which said sensing means includes means for measuring speed of the pump.

11. The flow rate control apparatus of claim 10 in which said sensing means also includes means for sensing the power used by said variable speed drive means.

12. A process for continuously controlling the rate of flow of a given liquid in a piping system in agreement with a desired flow rate, the system having a centrifugal pump which functions as the prime mover, a smoothly variable speed drive means for driving the pump, the process comprising the steps of:

(a) obtaining a set of data correlating the flow rate of a given liquid through the centrifugal pump with two flow-related variables:

(b) developing a set of mathematical relationships relating flow rate to said flow-related variables using said data and storing said set of equations in a calculating means;

(c) operating the system in a normal mode;

(d) indirectly and continuously measuring the instantaneous rate of flow of the liquid in the piping system, said measuring step including the steps of (i) sensing said two flow-related variables and generating and transmitting to said calculating means signals representative of said two flow-related variables with the piping system operating in said normal mode;

(ii) converting in said calculating means said signals representing said two flow-related variables to a first converted signal representative of flow rate through use of said stored set of mathematical relationships, (e) comparing the first converted signal representative of the flow rate with a reference signal that represents the desired flow rate and determining the difference therebetween; and (f) smoothly varying the rotational speed of the pump in response to said difference.

13. The process as in claim 12 wherein the step of obtaining a set of data correlating the flow rate of a given liquid through the centrifugal pump with two flow-related variables includes (i) temporarily installing a flow meter and throttling valve downstream of the pump, (ii) operating the pump over an expected range of flow rate values and system flow resistances by varying the speed of the pump and the opening of the control valve, and (iii) recording simultaneous values of the flow rate and said two flow-related variables.

14. The process as in claim 12 wherein one of said two flow-related variables is pump drive power.

15. The process of claim 12 wherein one of said two flow-related variables is pump pressure rise.

16. The process as in claim 15 wherein the other of said two flow-related variables is pump speed.

17. The process as in claim 15 wherein the other of said two flow-related variables is pump drive power.

18. The process as in claim 12 wherein one of said two flow-related variables is pump speed.

19. The process as in claim 18 wherein the other of said two flow-related variables is pump drive power.

20. Apparatus for monitoring mechanical performance of a centrifugal pump in a piping system that includes the pump coupled with a variable speed pump drive means as the prime mover for the liquid flowing therein, the apparatus comprising:

(a) means for continuously providing two separate indirect measurements of the instantaneous system flow rate, said means including (A) means for sensing three flow-related variables including pump pressure rise and at least two other flow-related variables associated with said pump and said drive means, said sensing means also including means for generating and transmitting signals representative of the instantaneous value of each of the sensed variables;

(B) calculating means including
  (i) memory means containing stored therein two sets of mathematical relationships each relating flow rate to two of the said three flow-related variables wherein the pump pressure rise variable is used in one and only one of said two relationship sets;
  (ii) converter means for receiving the transmitted signals and transforming the signals into a first converted signal and a second converted signal both representative of flow rate by use of the stored mathematical relationships, and
  (iii) means for comparing said first and second converted signals for determining the difference therebetween; and
(b) means responsive to said difference for actuating an alarm.

21. The flow rate control apparatus of claim 20 wherein said calculating means is digital and each of said three signals and each of said two converted signals is a pulse train having a frequency proportional to the value of the represented variable.

22. The flow rate control apparatus of claim 20 wherein the two other flow-related variables are pump speed and pump drive power.

23. A process for continuously monitoring the mechanical performance of a centrifugal pump installed in a piping system, said pump being coupled with a variable speed drive means and being the prime mover for liquid flowing therein, the process comprising the steps of:
(a) obtaining two sets of data, each set correlating the flow rate of the liquid through the centrifugal pump with two of at least three flow-related variables, said at least three flow-related variables including pump pressure rise wherein the pump pressure rise variable appears in one and only one of said two data sets;
(b) developing two sets of mathematical relationships each relating flow rate to two flow-related variables using said data sets and storing said sets of mathematical relationships in a calculating means;
(c) operating the system in a normal mode;
(d) continuously providing two separate indirect measurements of the instantaneous system flow rate, said providing step including the steps of
  (i) sensing pump pressure rise and said two other flow-related variables and generating and transmitting to said calculating means signals representative of said three flow-related variables with the piping system operating in said normal mode;
  (ii) converting in said calculating means said signals representing said three flow-related variables to first and second converted signals each representative of flow rate through use of said stored sets of mathematical relationships;
(e) comparing in said calculating means said first converted signal with said second converted signal and determining a difference therebetween; and
(f) actuating an alarm in response to said difference.

24. The process as in claim 23 wherein the step of obtaining two sets of data, each set correlating the flow rate of the liquid through the centrifugal pump with two of said three flow-related variables wherein the pump pressure rise variable appears in only one of said two data sets, includes
  (i) temporarily installing a flow meter and throttling valve downstream of the pump,
  (ii) operating the pump over an expected range of flow rate values and system flow resistances by varying the speed of the pump and the opening of the control valve, and
  (iii) recording, for each data set, simultaneous values of the flow rate and the corresponding two of said three flow-related variables.

25. The process for monitoring the performance of a centrifugal pump as in claim 23 wherein said two other flow-related variables associated with the pump and the pump drive means are pump speed and pump drive power.

26. Apparatus for continuously measuring a viscosity-related property of a liquid flowing at variable rates in a piping system that includes a centrifugal pump coupled with a variable speed pump drive means as the prime mover for the liquid, the apparatus comprising:
(a) means for sensing at least three flow-related variables, said flow-related variables being associated with said pump and said drive means, said sensing means also including means for generating and transmitting signals representative of the instantaneous value of each of the sensed variables;
(b) calculating means including
  (i) memory means containing stored therein a set of mathematical relationships relating the viscosity-related property to said three flow-related variables,
  (ii) converter means for receiving the transmitted signals and transforming the signals into a converted signal representative of the viscosity-related property by use of the stored mathematical relationships; and
(c) means for displaying said converted signal.

27. The viscosity-related property measuring apparatus as in claim 26 wherein said three flow-related variables are pump speed, pump drive power, and pump pressure rise.

28. The viscosity-related property measuring apparatus as in claim 26 wherein said calculating means is digital and said signals are pulse trains having frequencies proportional to the values of the respective represented variable.

29. A process for determining the value of a viscosity-related property of a liquid flowing in a piping system, the system having a centrifugal pump which functions as the final control element, a variable speed drive means for driving the pump, and means for sensing three flow-related variables associated with the pump and the pump drive means, the process comprising the steps of:
(a) obtaining a set of data correlating the viscosity-related property with the three flow-related variables;
(b) developing a set of mathematical relationships relating the viscosity-related property to the three flow-related variables using said data and storing said set of mathematical relationships in a calculating means;
(c) operating the system in a normal mode;
(d) sensing said three flow-related variables and generating and transmitting to said calculating means signals representative of the three flow-related variables with the piping system operating in said normal mode;

(e) converting in said calculating means said signals representing the three flow-related variables to a signal representative of the viscosity-related property through use of said stored set of mathematical relationships; and (f) displaying said converted signal.

30. The process for measuring a viscosity-related property of a liquid as in claim 29 wherein the step of obtaining a set of data correlating the viscosity-related property with the three flow-related variables includes (i) temporarily installing a flow meter and throttling valve downstream of the pump, (ii) operating said pump in said system with fluids of different but known values of the viscosity-related property, and (iii) recording simultaneous values of the viscosity-related property and of said three variables.

31. The process for measuring a viscosity-related property of a liquid as in claim 29 wherein said three flow-related variables associated with said pump and said pump drive means are pump speed, pump drive power, and pump pressure rise.

* * * * *